US012231345B2

(12) United States Patent
Baruah et al.

(10) Patent No.: US 12,231,345 B2
(45) Date of Patent: Feb. 18, 2025

(54) SERVICE LEVEL AGREEMENT BASED DATA FORWARDING WITH LINK AGGREGATION GROUPING

(71) Applicant: Cisco Technology, Inc., San Jose, CA (US)

(72) Inventors: Pritam Baruah, Fremont, CA (US); Afroze Mohammad, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 244 days.

(21) Appl. No.: 18/081,503

(22) Filed: Dec. 14, 2022

(65) Prior Publication Data
US 2024/0205160 A1  Jun. 20, 2024

(51) Int. Cl.
*H04L 12/24* (2006.01)
*H04L 41/12* (2022.01)
*H04L 47/2425* (2022.01)
*H04L 47/41* (2022.01)

(52) U.S. Cl.
CPC .......... *H04L 47/41* (2013.01); *H04L 47/2425* (2013.01)

(58) Field of Classification Search
CPC ..... H04L 47/41; H04L 47/2425; H04L 12/24; H04L 41/12; H04L 21/28
USPC ......................................................... 709/238
See application file for complete search history.

(56) References Cited

U.S. PATENT DOCUMENTS

| | | | |
|---|---|---|---|
| 7,599,290 B2* | 10/2009 | Dos Remedios | H04L 47/12 370/230.1 |
| 2013/0132562 A1* | 5/2013 | Bandyopadhyay | H04L 69/326 709/224 |
| 2017/0047999 A1* | 2/2017 | Wei | H04L 41/12 |
| 2017/0099215 A1 | 4/2017 | Arumugam et al. | |
| 2017/0149615 A1* | 5/2017 | He | G06F 9/00 |
| 2019/0089627 A1 | 3/2019 | Mirsky et al. | |
| 2020/0382394 A1 | 12/2020 | Kalburgi | |
| 2021/0385155 A1 | 12/2021 | Suryanarayana et al. | |
| 2022/0007401 A1 | 1/2022 | Harada | |

OTHER PUBLICATIONS

Cisco, Bidirectional Forwarding Detection on Link Agregation Group B, IP Routing: BFD Configuration Guide, Cisco IOS XE 17, May 5, 2022.

* cited by examiner

*Primary Examiner* — Jude Jean Gilles
(74) *Attorney, Agent, or Firm* — Lee & Hayes, P.C.

(57) ABSTRACT

Techniques are described for providing service level agreement performance in a link aggregation group computer networking environment. A performance measurement data packet such as a bi-directional forwarding detection (BFD) packet is received. The performance measuring data packet can be considered a parent performance measurement data packet is split into multiple child performance measurement data packets which are each different constituent links of a link aggregation database. The performance of each constituent is tested to determine which constituents satisfy service level agreement parameters. Data packets can then be sent to constituents that meet the data packet's service level agreement performance parameters while still allowing link aggregation grouping.

20 Claims, 8 Drawing Sheets

SERVICE LEVEL AGREEMENT BASED DATA FORWARDING WITH LINK AGGREGATION GROUPING

TECHNICAL FIELD

The present disclosure relates generally to data forwarding to meet Service Level Agreement (SLA) performance requirements in a Link Aggregation Group data routing environment.

BACKGROUND

Ever increasing amounts of data are routed through computer networks. Performance requirements for such data routing can vary depending upon the application applying such data. For example, in an application such as video conferencing there may be a need to maintain low jitter or low latency, whereas other applications such as email may have less of a need to maintain such strict performance requirements. Service Level Agreement (SLA) can be employed to tailor performance requirements for specific applications. An SLA can apply certain data routing performance parameters such as jitter, latency and/or data loss to the transmission of data in a network.

Currently, data transfer that employs Service Level Agreement (SLA) utilizes individual physical interfaces for tunnel transport. As such, every tunnel is egressed or ingressed through one physical interface, with or without loopback Transport Location (TLOC) and with or without Equal Cost Multi-Path (ECMP) on the underlay of the network. Using one physical interface allows seamless Service Level Agreement (SLA) based forwarding, because Bi-Directional Forwarding (BFD) and data traffic will always use the same egress interface.

In a computer network, Link Aggregation Grouping (LAG) can be used to increase bandwidth and reduce data loss. Multiple constituent links can be aggregated into a group. Data packets can be routed through the constituent links using load balancing to select an efficient link path. If one constituent fails or loses data rate or bandwidth data packets can be routed to a different link in the LAG.

However, meeting Service Level Agreement requirements when using Ling Aggregation Grouping presents challenges. Because a link aggregation group can use multiple interfaces, a BFD used to test whether performance metrics meet SLA requirements could traverse a different interface than production data in the same LAG. Production data could be forced through the same LAG constituent as the BFD, however, that would eliminate any performance benefits provided by the use of LAG.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes techniques for providing Service Level Agreement (SLA) compliant data routing in a Link Aggregation Group (LAG) networking architecture. A performance measuring data packet is received and is split into multiple child performance measuring data packets. In one embodiment, the received performance measuring data packet can be referred to as a "parent" performance measuring data packet. The child performance measurement packets are then routed to separate constituents of a Link Aggregation Group to test performance of each constituent. A determination can be made as to which constituents satisfy certain performance requirements of one or more Service License Agreements (SLAs). Then, a data packet requiring an SLA performance parameter is routed to one or more of the constituents that have been determined to meet the SLA requirement.

Additionally, the techniques described in this disclosure may be performed as a method and/or by a system having non-transitory computer-readable media storing computer-executable instructions that, when executed by one or more processors, performs the techniques described above.

Example Embodiments

Link Aggregation Grouping can be used in a computer network to improve data transmission efficiency and reliability. Link aggregation allows a network switch to treat multiple physical links between two end-points as a single logical link. All of the physical links in a given Link Aggregation Group (LAG) can operate in full-duplex mode at the same speed. LAGs can be used to directly connect two switches when the traffic between them requires high bandwidth and reliability, or to provide a higher-bandwidth connection to a public network. Management functions treat a LAG as if it were a single physical port. LAG can be applied to a Virtual Large Area Network (VLAN), Software Defined Wide Area Network (SDWAN) as well as other network architectures.

A Link Aggregation Group (LAG) bundles all of the controller's distribution system ports into a single 802.3ad port channel. This reduces the number of IP addresses required to configure the ports on the controller. When LAG is enabled, the system dynamically manages port redundancy and load balances access points transparently to the corresponding user.

LAG simplifies controller configuration because it is no longer necessary to configure ports for each interface. If any of the controller ports fail, traffic is automatically migrated to one of the other ports. As long as at least one controller port is functioning, the system continues to operate, access points remain connected to the network, and wireless clients continue to send and receive data. A wireless Virtual Large Are Network (VLAN) can only be part of one port channel. Link Aggregation Control Protocol (LACP) is supported on a stand-alone controller.

Link Aggregation Control Protocol (LACP) is a part of an IEEE specification (802.3ad) that makes it possible to bundle several physical ports together to form a single logical channel. LACP allows a switch to negotiate an automatic bundle by sending LACP packets to a peer. By using the LACP, the wireless controller learns the identity of peers that are capable of supporting LACP, and the capabilities of each port. The LACP then dynamically groups similar configured ports into a single logical link (channel or aggregate port). Similarly, configured ports are grouped based on hardware, administrative, and port parameter constraints. If any of the controller ports fail, traffic is automatically migrated to one of the other ports. As long as at least one controller port is functioning, the system continues to operate, access points remain connected to the network, and wireless clients continue to send and receive data.

To configure LAG using LACP, multiple port-channel interfaces must be created, and these interfaces should be added to the corresponding port bundle. LACP should also be configured on the uplink switch for the LACP bundle to come up.

Port Aggregation Protocol (PAgP) developed by CISCO®, is one example of a protocol that can be run on controllers. PAgP facilitates the automatic creation of EtherChannels by exchanging PAgP packets between Ethernet ports. PAgP packets are sent between Fast EtherChannel-capable ports in order to form a channel. When any of the active ports fail, a standby port becomes active.

By using PAgP, the controller learns the identity of partners that are capable of supporting PAgP and the capabilities of each port. PAgP then dynamically groups similarly configured ports (on a single device in a stack) into a single logical link (channel or aggregate port). Similarly, configured ports are grouped based on hardware, administrative, and port parameter constraints.

To configure LAG using PAgP, multiple port-channel interfaces must be created, and these interfaces should be added to the corresponding port bundle. PAgP should also be configured on the uplink switch for the PAgP bundle to come up. To configure LAG in "on" mode, multiple port-channel interfaces must be created, and these interfaces can be added to the corresponding port bundle. LACP should also be configured on the uplink switch for the LACP bundle to come up.

Different network applications can require different performance parameters. Service Level Agreements (SLAs) apply rules for minimum performance parameters that must be met for a given application. In some applications an SLA can set rules for a maximum amount of jitter, maximum amount of latency and/or maximum level of data loss. A network administrator can set these SLA rules depending upon the application being used. For example, in a video conference setting there may be a need to maintain a low level of jitter. In another application such as email there may not be such a need for low jitter.

An SLA can include not only a description of the services to be provided and their expected service levels, but also metrics by which the services are measured, the duties and responsibilities of each party, the remedies or penalties for breach, and a protocol for adding and removing metrics.

SLAs are a key part of IT Service Management (ITSM). SLAs are agreements that: define what users and customers can expect from the IT services; define targets for suppliers; provide suppliers, customers and stakeholders with regular information on how the services are delivering on these expectations. This information is used to drive improvements. Use of SLAs can support effective working relationships between IT and the business employing the IT, as both should be involved in the SLAs' creation, maintenance, and use. Service Level Management is the process responsible for SLAs in an organization.

An SLA is a formal, structured agreement between two parties to provide one or more services to a mutually agreed performance level. One of the parties is the customer of the services. The other party is the supplier that provides the services. A supplier can be part of the same organization as the customer (service provider) or in a different organization (external). The SLA can be a physical or electronic document. The document extends the definition of a service from one contained in a service catalogue and provides an agreed and guaranteed minimum level of service performance.

An SLA can describe: the services it covers; the scope of the services; the service characteristics, including the hours when it is available and the hours that are supported; the targets for these services (known as service levels); and the responsibilities of both parties, including responsibilities for review and maintenance of it contents. It can also include a pricing model, with any charges for using the service and penalties that are payable for failures to fulfill the service levels. The SLA should be written from the viewpoint of the customer, to facilitate understanding.

These different terms can be confusing, especially to those who aren't well versed in IT Service Management. It is valuable to have a formal agreement on the levels of service a supplier provides a customer and documented in an ALS. This ensures that the customer is aware of what can be expected and ensures that the supplier is aware of what must be provided. Many organizations just use the term SLA to refer to all of the three types of service level agreement.

It is good practice for an organization to have one SLA per supplier, which includes all of the services the supplier provided. This simplifies the creation of the agreement, as the general requirements will be the same and the services will often have the same service levels. The SLA can be subsequently updated to add new services or remove retired ones. There is no limit to how many services can be in one agreement. It is also good practice to ensure SLAs exist for every supplier, including internal ones. This helps to ensure that the expectations of the customer are explicitly stated, and the suppliers understand them and that the customer understands what service it can expect to receive.

A multi-level SLA is a structure used to avoid duplication and reduce the frequency of updates to the SLAs, whilst allowing the flexibility to customize them for specific customers and services. Using a multi-level SLA structure is typically for documenting service levels when the suppliers are within the same organization. It can also be particularly useful when an external supplier provides multiple services, which mostly share common requirements, but where certain services have different service levels or requirement, such as 24-7 support requirements. A typical multi-level SLA structure can have three levels. First, the SLA can include a corporate level, covering requirements common to every customer within a business. An example is an SLA for every user of an email system, so passwords can be changed every 30 days. Second, the SLA can include a customer level, which can cover requirements specific to a particular customer or set of customers within a business, including all of the services delivered to it. An example is a standard level of service availability for all services provided to one customer. Third, the SLA can include a service level, which can cover requirements for specific services. This is lowest level and can be used if a specific service has requirements and service levels that are different from the standard for the business or a customer.

The customer is the person or organization that uses the services. The customer can be internal or external to the organization. Businesses can provide services to customers. These can be services based on IT, such as cloud-based applications or non-IT services, such as a holiday booking call center. The customer for the services can be an individual or another company. Even when it is impractical for external customers to sign an agreement formally, SLAs should still be created, as they provide a clear and precise description of what the customer can expect and drive improvements in service quality.

SLAs can be useful whenever there is a need for a formal agreement between two parties, detailing the expected levels of service, accompanied by the associated responsibilities. IT service management has traditionally only included IT services, including the service desk in SLAs. Service levels and the associated agreements can, however, include types of services such as labor-based services including IT support, commodity services including supplying consumables and technical, non-IT service. SLAs can also be used for process-related activities where there is a need to define, monitor and measure compliance. This can include attendance at formal meetings, targets for responding to complaints and achieving deadlines for submitting bills.

Service Level Management (SLM) is the process that negotiates SLAs between the customer and the supplier and aims to ensure that they are fulfilled. SLM can ensure that all other processes used in IT service management support achieving the agreed upon service levels. This can include verifying that all SLAs can support the agreed service-level targets. Service level management monitors and reports on the service levels documented in the agreed SLAs conducts regular service reviews with customers and suppliers, identifies required improvements, and then reports on and monitors improvement actions.

The achievement of every service-level target document can be monitored and reported. How this is accomplished depends upon the precise nature of the service level. The method and frequency of monitoring should be defined and documented in the SLA. For complex targets and where penalties for failure exist, it is good practice to test all calculations before going live. SLA reports can be automatically produced from the data captured during monitoring, as this will give an accurate view of the true SLA achievement. SLA reports should be produced often enough to highlight trends in SLA achievement before failures occur and to generate confidence in the process. During the early stages of a service, weekly reporting can be used to verify whether all processes, systems, etc. are working as expected. Reporting to customers can be reduced to a monthly interval and even quarterly as confidence is gained in both the services and the supplier.

Therefore, in the case where an SLA involves specific network data transfer performance parameters, such as but not limited to jitter, loss or latency, it is necessary to have a means for periodically testing such performance parameters. In order to test such performance parameters, a performance measurement packet can be sent through the network such as by implementing Bidirectional Forwarding Detection (BFD). BFD is a detection protocol designed to provide fast forwarding path failure detection times for all media types, encapsulations, topologies, and routing protocols. In addition to fast forwarding path failure detection, BFD provides a consistent failure detection method for network administrators. Because the network administrator can use BFD to detect forwarding path failures at a uniform rate, rather than the variable rates of different routing protocol "hello" mechanism, network profiling and planning is facilitated, and reconvergence time can be consistent and predictable.

BFD provides fast BFD peer failure detection times independently of all media types, encapsulations, topologies, and routing protocols. By sending rapid failure detection notices to the routing protocols in the local router to initiate the routing table recalculation process, BFD contributes to greatly reduced overall network convergence time. When Open Shortest Path First (OSPF) protocol discovers a neighbor, it sends a request to the local BFD process to initiate a BFD neighbor session with the OSPF neighbor router. The BFD neighbor session with the OSPF neighbor router is established.

When a failure occurs in a network, the BFD neighbor session with the OSPF neighbor router is torn down. The BFD notifies the local OSPF process that the BFD neighbor is no longer reachable. The local OSPF process tears down the OSPF neighbor relationship. If an alternative path is available, the routers will immediately start converging on it. Once a BFD session has been established and timer negations are complete, BFD peers send BFD control packets that act in the same manner as in Interior Gateway Protocol (IGP) hello protocol to detect liveliness, except at a more accelerated rate.

Therefore, in order to determine whether such SLA metrics are being met, a data measurement packet can be sent through the network. As discussed above, one such data measurement packet can be referred to as a Bidirectional Forwarding Detection (BFD) packet. For the BFD to effectively ensure that an SLA requirement is being met, the BFD packet must travel along the same network path as the data packet that requires the SLA. This presents a challenge when using Link Aggregation Grouping (LAG) in a situation where a data packet requires SLA metrics.

As discussed above, LAG includes multiple data links or interfaces that function as a single logical link or interface. If a BFD data packet is used to test for the SLA requirements of a data packet, in a LAG there is no way to ensure that the BFD packet and the data packet were routed through the same link. Therefore, the SLA for the data packet will be violated. On the other hand, if the BFD packet and the data packet are forced into the same link or constituent of the LAG, the benefits of the link aggregation are lost. The routing stops behaving as a LAG, because the data packet is not free to switch from one link to another to ensure maximum performance and reliability.

The described embodiments provide a solution to this challenge to allow link aggregation to be employed without violating the SLA terms. As described in detail herein below, a BFD packet can be split into multiple child BFD packets which can then be routed through each link of the LAG. In that way, a determination can be made as to which links or constituents of the LAG satisfy the SLA metrics requirements. The data packet can then be routed through any of those links, thereby providing the benefits of LAG without violating the SLA metrics requirements.

In one embodiment, the parent and child performance measurement packets are Bidirectional Forwarding Detection (BFD) data packets. In one embodiment, each of the child performance measurement packets (e.g. BFDs) can include a unique link aggregation group constituent identifier, which in one embodiment can comprise a type-length-value extension. Each of the child performance measurement packets is routed through its respective constituent link to a switch connected with the link and then is again received to provide data regarding performance parameter metrics for each constituent of the Link Aggregation Group (LAG). In this way a determination can be made as to which constituents satisfy the SLA requirements for a data packet to be routed. This can, therefore, provide a hybrid process where Link Aggregation Grouping can be employed using constituents that are capable of meeting SLA requirements, thereby ensuring that SLA is not violated in the LAG.

Additionally, the techniques described herein may be performed by a system and/or device having non-transitory computer-readable media storing computer-executable instructions that, when executed by one or more processors, performs the method described above. Link Aggregation Grouping (LAG) provides increased reliability and availability. If one of the physical links in the LAG goes down, traffic is automatically and transparently reassigned to one of the other physical links. LAG also provides better use of physical resources. Traffic can be load-balanced across the physical links. In addition, LAG can provide increased bandwidth. The aggregated physical links deliver higher bandwidth than each individual link alone.

Figure 1:
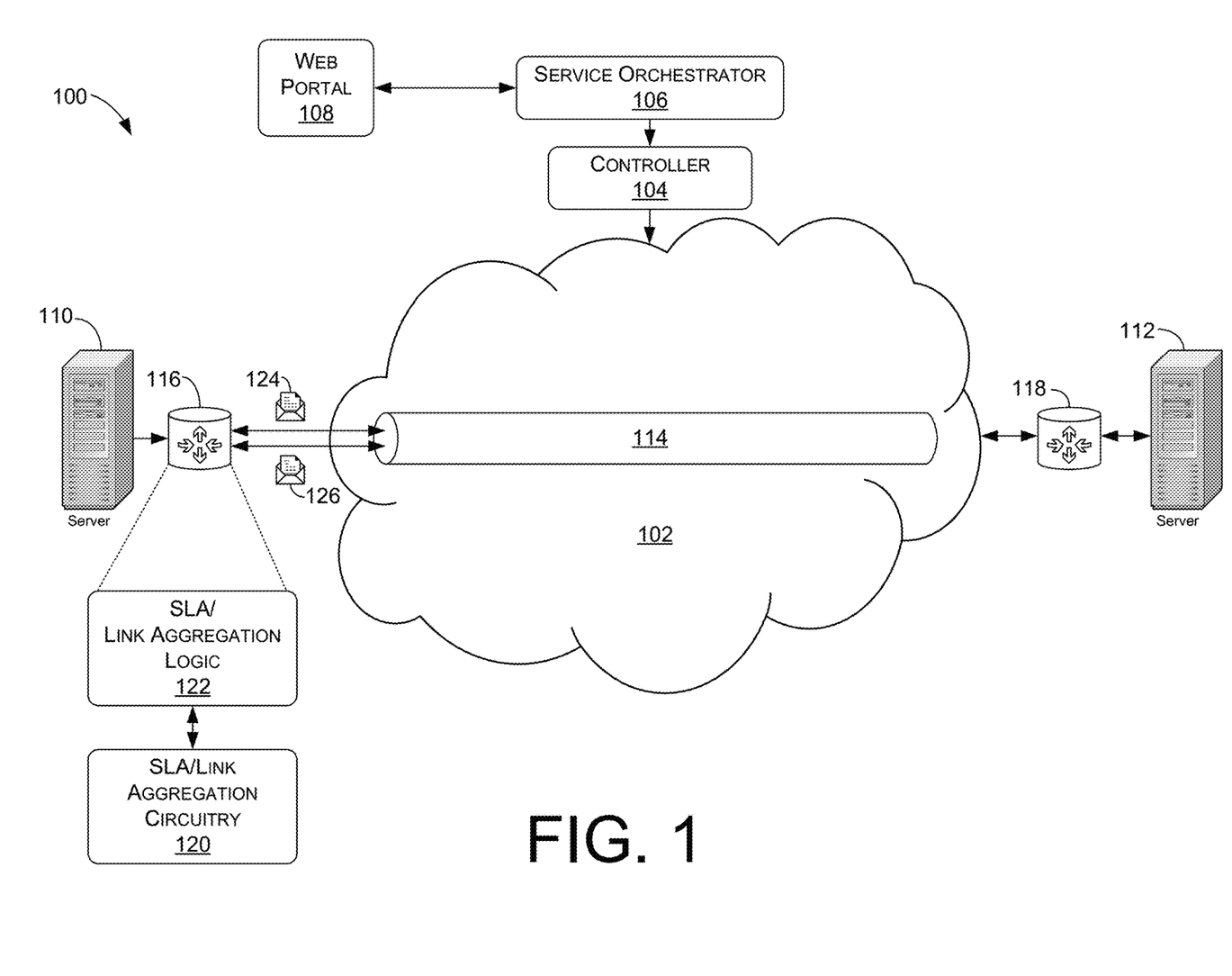
FIG. 1 illustrates a schematic diagram of a Software Defined Wide Area Network (SDWAN) networking architecture.

FIG. 1 schematically illustrates a computer network architecture 100. In one embodiment, the computer networking architecture 100 can be a Software Defined Wide Area Network (SDWAN). The network environment 100 can include a software defined network 102 that can be configured, modified or changed as needed to meet changing network demands. In one embodiment, the network 102 can be managed by a controller 104. The controller 104 can centralize management to the SDWAN edge and the SDWAN gateway. A service orchestrator 106 can be provided to manage SDWAN service lifecycle such as fulfillment, performance monitoring, analytics, security and policy management. A subscriber web portal 108 can be provided to manage the service orchestrator 106 and controller 104. The web portal 108 can be used in conjunction with the service orchestrator 106 to monitor the SDWAN as a service.

In one embodiment, data can be routed through the network 102 between computer devices 110, 112 through a logical data tunnel 114 using network switches 116, 118. In one embodiment, the network switches 116, 118 can be routers. In other embodiments the switches 116, 118 can be some other type of network switching devices, such as bridges, load balancers, etc. One or more of the network switches 116 includes circuitry 120 and computer logic 122 configured to provide Link Aggregation Grouping (LAG) while also ensuring Service Level Agreement is not violated. The switch 116 can send performance measurement data packets 124 as well as SLA production data packets through the network 102 such as through the logical data tunnel 114. In one embodiment, the performance measurement data packet 124 can be a bidirectional forwarding detection (BFD) packet and can measure and determine performance parameters of constituent links, such as through the data tunnel 114, to ensure that when the production data packet 126 is routed through the tunnel SLA requirements are not violated, as will be described in greater detail herein below.

Figure 2:
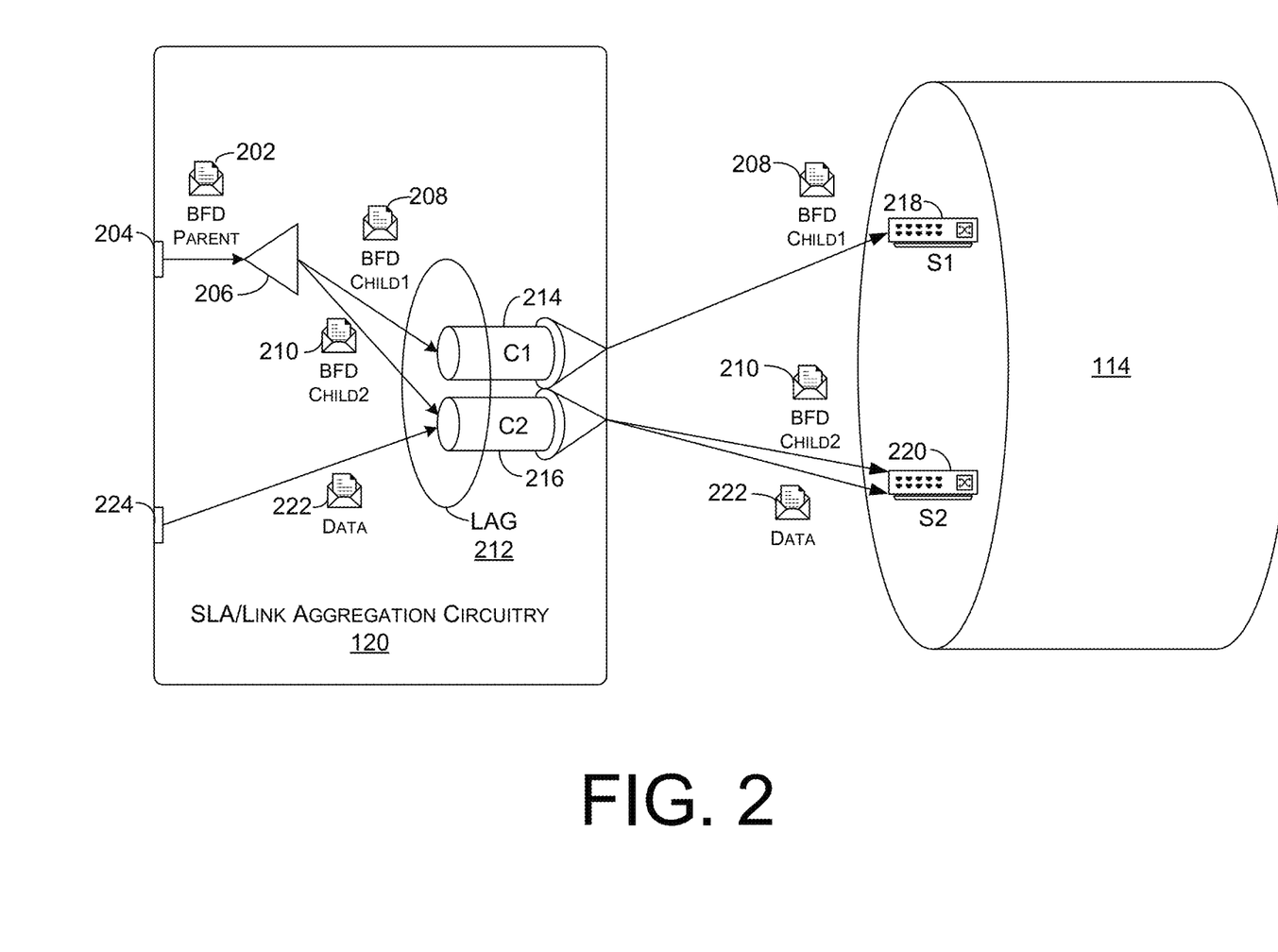
FIG. 2 illustrates a schematic diagram of SLA/Link Aggregation Circuitry showing a bifurcated test packet and a data packet being transmitted through a data tunnel in a Link-Aggregation data transmission environment.

FIG. 2 illustrate an enlarged schematic of the circuitry 120 of a network switch 116 of FIG. 1, which is configured to test performance parameters of multiple constituent links of a Link Aggregation Group (LAG) to ensure that SLA requirements of a data packet are not violated when routing the data packet through the LAG. A data measurement packet 202 is received such through an ingress port or constituent 204. In one embodiment, the data measurement packet 202 can be a bidirectional forwarding detection (BFD) data packet. For purposes of clarity the data measurement packet 202 will be referred to as a BFD packet, although it should be understood that the BFD packet 202 encompasses a packet intended to measure network performance more generally. The BFD packet 202 can be referred to as a "parent" BFD packet. The parent BFD packet 202 is sent to bifurcator circuitry 206, which splits the parent data packet 202 into multiple "child" BFD data packets. For example, in one embodiment as shown in FIG. 2, the parent BFD 202 is split into a first child BFD packet 208 and a second child BFD 210.

Each of the child BFD packets 208, 210 is routed to a separate constituent of a Link Aggregation Group (LAG) 212. For example, as shown in FIG. 2, child BFD 208 is routed to a first constituent 214, whereas the second child BFD is routed to second constituent 216, where the first and second constituents 214, 216 are constituent links of the Link Aggregation Group (LAG) 212. The first child BFD 208 can be forwarded to a first network switch 218, which can be a switch of a logical data tunnel such as the logical data tunnel 114 described above with reference to FIG. 1. Similarly, the second child BFD 210 is routed to a second network switch 220, which also may be part of the logical data tunnel 114.

Figure 3:
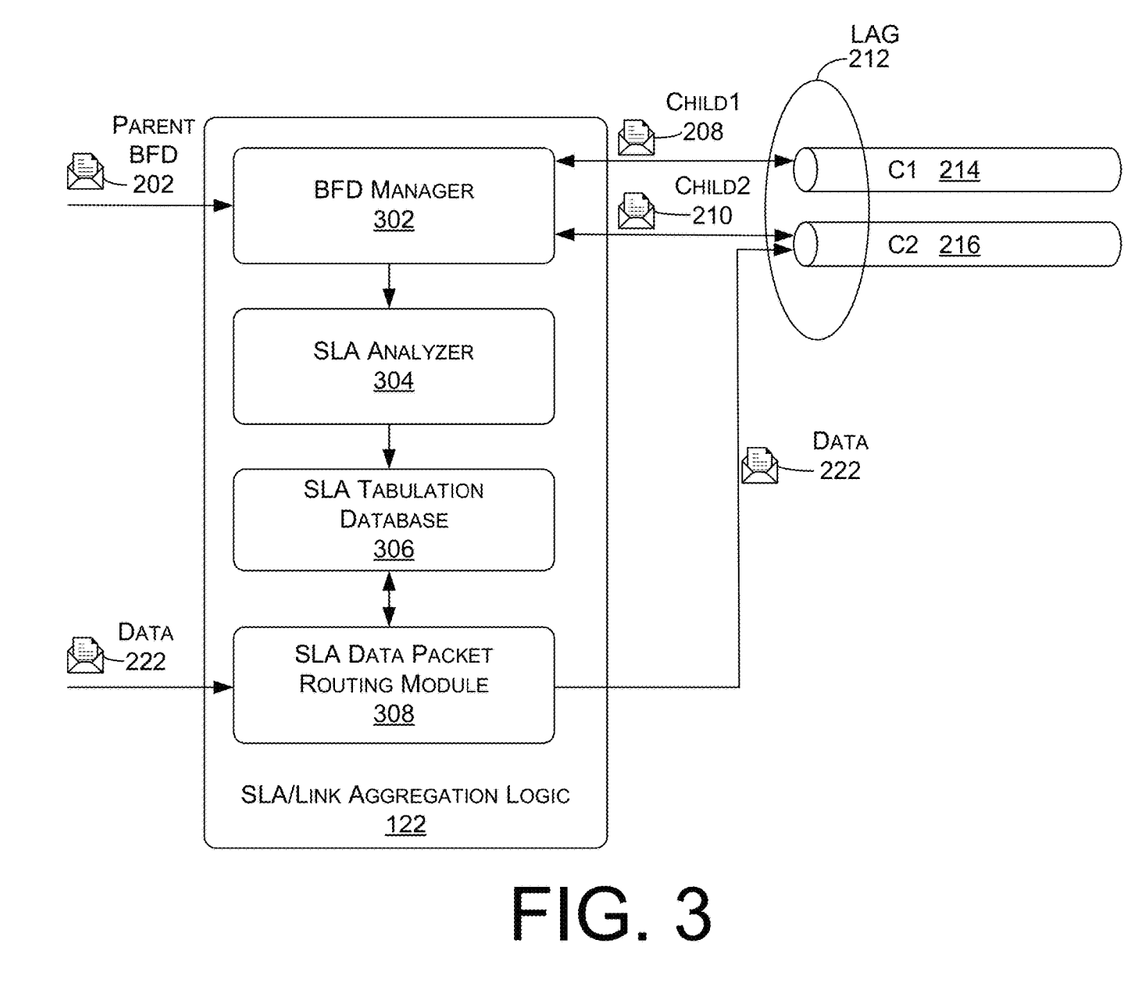
FIG. 3 illustrates a schematic representation of SLA data processing logic for sending Bi-directional Forwarding Detection (BFD) packets and production data packets through Link Aggregation Group data tunnels.

FIG. 3 illustrates a schematic view of logic and circuitry for processing BFDs and determining LAG routing of data packets without violating SLA requirements. In one embodiment, the SLA/Link Aggregation Logic 122 can include a BFD Analyzer Module 302, an SLA Analyzer Module 304, an SLA Tabulation Database 306 and an SLA Data Packet Routing Module 308.

As discussed above with reference to FIG. 2, the first and second child BFDs 208, 210 are sent to first and second constituents 214, 216 respectively. The first and second child BFD packets 214, 216 can return to the to the circuitry 120 (FIG. 2) and can be analyzed by SLA/Link Aggregation Logic 120 to determine which constituents 214, 216 have performance parameters that satisfy various SLAs. Each child BFD 208, 210 corresponds to a different constituent 214, 216. In addition, in one embodiment, each child BFD 208, 210 can be modified with an extension Type-Length-Value (TLV) containing a custom type LAG constituent identifier. Therefore, in the shown example, the first child BFD packet 208 will contain C1 constituent 214 in its TLV, whereas the second child BFD packet 210 will contain C2 constituent in its TLV. When the child BFDs 208, 210 return packets are received, the BFD manager 302 decodes the custom TLV and gets the LAG constituent ID. The BFD Analyzer Module 302 uses the information received from the BFD to determine various performance parameters of each constituent 214, 216 of a Link Aggregation Group 212. In one embodiment, these performance parameters can include one or more of jitter, latency and/or loss. In one embodiment, the BFD manager 302 can include logic or circuitry to split a parent BFD into multiple child BFDs as described above. For Example, the BFD manager 302 can receive a BFD 202 which can be referred to as a parent BFD 202 and can then split the parent BFD 202 into multiple child BFDs (e.g. 208, 210) as described above.

The BFD manager 302 can send the data regarding constituent performance parameters and can process this information to determine which constituents, if any, meet various SLA performance requirements. As discussed above, in one embodiment these SLA performance requirements can include one or more of jitter, latency and/or loss. Once the SLA Analyzer has made this calculation regarding which constituents meet which SLA performance requirements, the results can be stored in the SLA Tabulation Database 306.

A data packet 222 can be received through an ingress port 224 as shown in FIG. 2. This data packet can have one or more SLA requirements. As shown in FIG. 3, the data packet is received and processed by the SLA Packet Routing Module 308, which analyzes information such as extensions or metadata of the data packet to determine which SLA performance parameters are required by the data packet 222. The SLA Data Packet Routing Module 308 can access the SLA Tabulation Database 306 to determine which constituents (e.g. 214, 216 meet these SLA requirements. The SLA Data Packet Routing Module 308 can then route the data packet 222 to one of the constituents that has been found to meet the SLA requirements. If multiple constituents have been found to meet the SLA requirements, then the data can be routed to one of those constituents using load balancing algorithms in a Link Aggregation Group protocol. In this way the benefits of Link Aggregation Grouping are maintained as much as possible without violating SLA requirements. It should be noted the above description has been described has having two constituents 214, 216 in the Link Aggregation Group (LAG). This has, however, been for purposes of illustration. The above process and system can be applied to a LAG having more than two constituents and can also be applied to a network architecture having more than one LAG.

Figure 4:
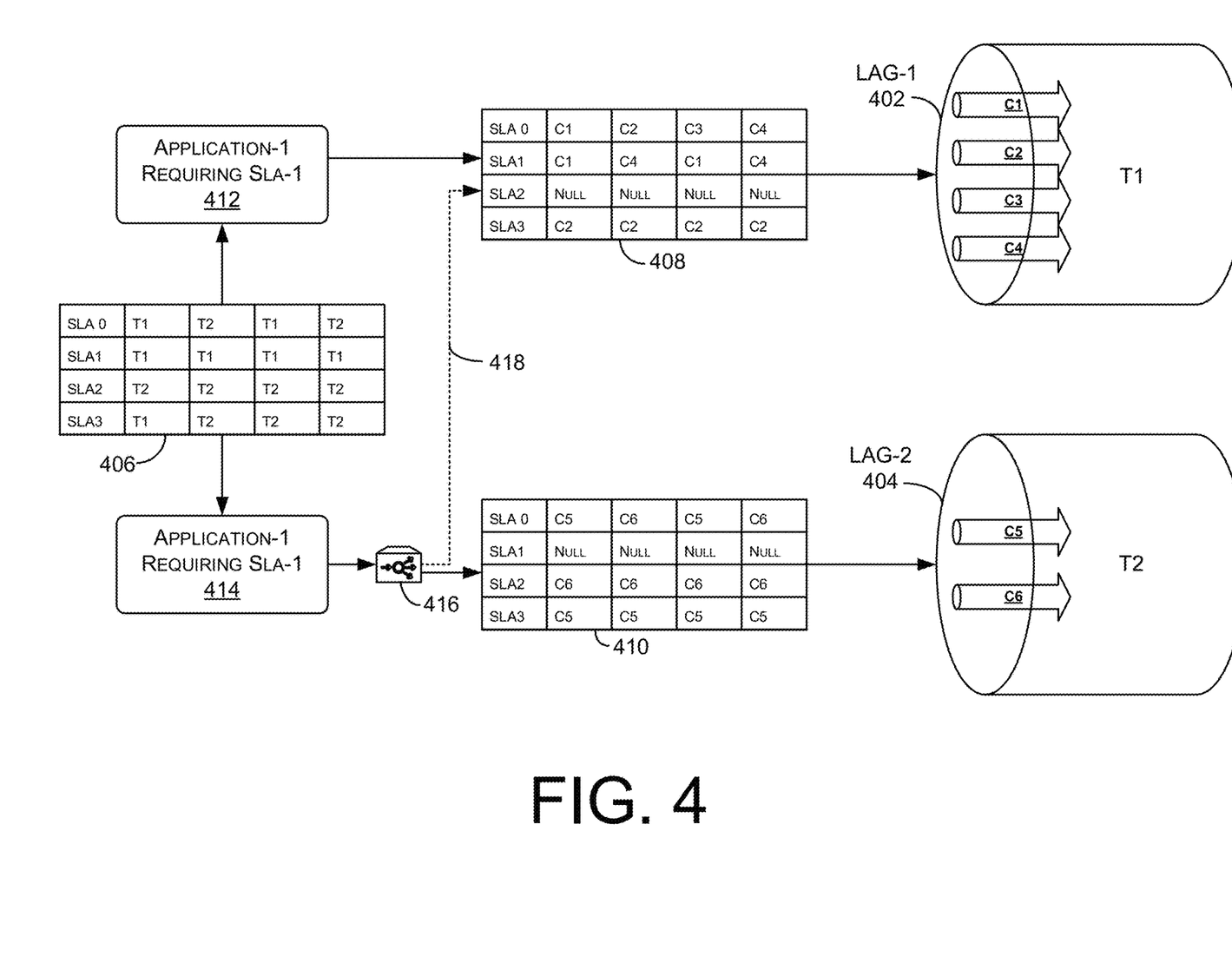
FIG. 4 illustrates a schematic including tables, illustrating a method for selecting data tunnels and Link Aggregation Groups for meeting Service Level Agreement parameters.

FIG. 4 illustrates various tables indicating how a data packet can be routed to satisfy SLA requirements in a Link Aggregation Group. Tables and data structure illustrated with reference to FIG. 4 can correspond with the data that may be stored in SLA Tabulation Database 306 of FIG. 3. FIG. 4 shows a first Link Aggregation Group LAG-1 402, and a second Link Aggregation Group LAG-2 404. LAG-1 402 defines a data tunnel T1 having four constituents C1, C2, C3 and C4. LAG-2 404 defines a data tunnel T2 having two constituents C5 and C6. Table 406 indicates various SLAs, and which LAG tunnels satisfy those SLAs. In Table 406, SLA0 indicates no SLA requirement. SLA1, SLA2, SLA3 indicate three different performance requirements, which in one embodiment can include one or more of jitter, latency and/or loss. In table 406, if a data tunnel has multiple constituents and each meet different SLAs, then the tunnel is considered to satisfy each of these SLAs. In other words, if even one of the constituents of a data tunnel satisfies an SLA, then that tunnel is considered to satisfy that SLA.

Table 408 indicates which constituents of LAG-1 402 (e.g. tunnel T1) satisfy each of the SLAs. SLA 0 indicates no SLA requirement at all, so all constituents meet that SLA requirement. In Table 408, it can be seen that constituents C1 and C4 meet the SLA requirement for SLA-1. None of the constituents of LAG 1 402 meet the requirements of SLA2, and only constituent C2 meets the requirements of SLA 3.

Table 410 indicates which constituents of LAG-2 404 satisfy which SLA requirements. In Table 410 it can be seen that both constituents C5 and C6 satisfy SLA-0, since that represents no SLA requirements. Neither of the constituents satisfy SLA1. Only constituent C6 satisfies SLA2, and only constituent C5 satisfies SLA3.

With continued reference to FIG. 4, Application-1 412 represents a computer application being used to deliver a data packet wherein Application-1 412 requires SLA-1 performance parameters. Referring to table 406 it can be seen that at the tunnel level only LAG-1 404 (Tunnel T1) satisfies SLA-1. Then, using Table 408 it can be seen that constituents C1 and C4 meet SLA1. Therefore, the data packet implementing Application-1 can be routed to either of constituents C1 or C4 using LAG load balancing to determine which constituent (C1 or C4) to route the data packet to. In this way Link Aggregation Grouping can be employed to maximize bandwidth while also ensuring that SLA1 is not violated.

As another example, Application-2 414 requires SLA3. Referring to table 406 it can be seen that both T1 and T2 satisfy SLA3. Employing load balancing, such as implemented by load balancer 416 a data packet employing Application-2 can be routed to LAG 2 (tunnel T2). This is by way of illustration, however, as the data packet employing Application-2 could also have been sent to LAG1 (tunnel T1) as indicated by dashed line 418. Since the data packet requiring SLA3 is being routed to LAG2 (tunnel T2) table 410 can be referenced to determine which constituents of LAG2 satisfy SLA3. From the Table 410 it can be seen that C5 satisfies SLA3. Therefore, the data packet requiring SLA3 is routed to constituent C5, thereby ensuring that the SLA is not violated. The above description of FIG. 4 discusses various hypothetical scenarios in order to illustrate logic and method for routing data packets in a LAG environment without violating SLA requirements. However, this has been by way of example, as many different scenarios may be possible.

Figure 5A:
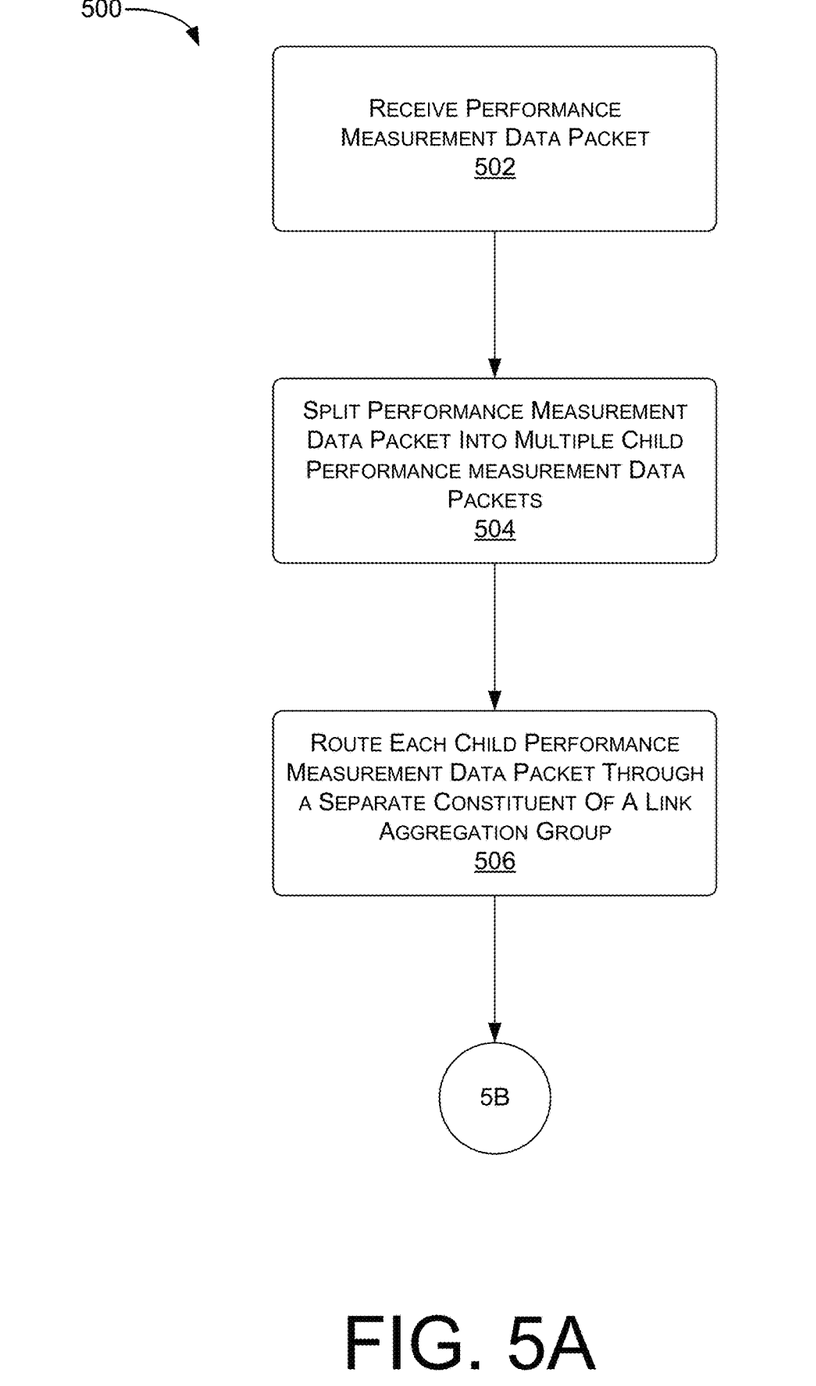
FIGS. 5A-5B illustrate a flow diagram of an example method for providing Service Level Agreement data forwarding in a Link Aggregation Group according to an embodiment.
Figure 5B:
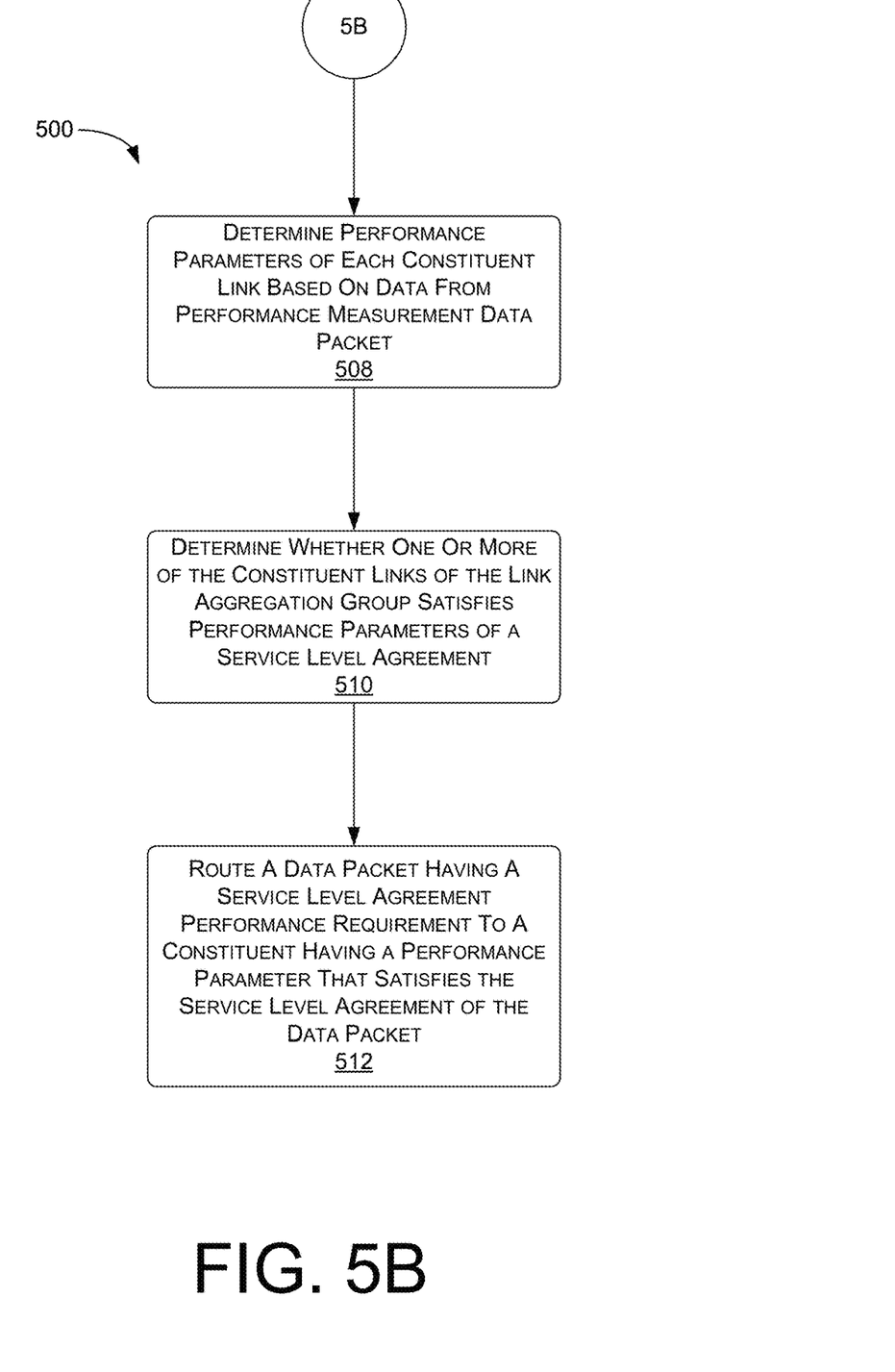

FIGS. 5A-5B illustrate a flow diagram of example methods 500 that illustrates aspects of the functions performed at least partly by the devices in the distributed application architecture as described in FIGS. 1-4. The logical operations described herein with respect to FIGS. 5A-5B may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 5A-5B and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIGS. 5A-5B show a flowchart illustrating a method 500 according to an embodiment. With reference to FIG. 5A a performance measurement data packet is received 502. The performance measurement data packet can be received by a network switch or node of a computer network can be received from a switch, router or other computer device such as a server connected with the computer network. In one embodiment, the performance measurement data packet can be a Bidirectional Forwarding Detection (BFD) data packet. In one embodiment, the performance measurement data packet can be a parent packet and can be a parent BFD packet.

The performance measurement data packet (e.g. parent BFD packet) is split into multiple child performance measurement packets 504. In one embodiment, the parent performance measurement packet can be split into two child performance measurement packets, while in another embodiment, the parent performance measurement packet can be split into more than two child performance measurement packets. The splitting of the performance measurement data packet into multiple child performance measurement data packets can be performed by software (such by a Central Processing Unit (CPU)) or hardware (such as an Application Specific Integrated Circuit (ASIC)) of the network switch that received the performance measurement data packet.

Each of the child performance measurement data packets is routed to a separate constituent link of a Link Aggregation Group (LAG) 506. In one embodiment, each child performance measurement packet can be modified with an extension TLV containing a custom type LAG constituent identifier.

Using the child performance measurement packets, performance parameters of each of the separate constituent of the LAG are determined 508. A determination is made as to whether each of the separate constituents of the LAG satisfies performance parameter requirements of one or more Service Level Agreements (SLAs) 510. In one embodiment, example service level agreement performance parameter requirements can include one or more of jitter, latency and/or loss. In response to determining whether each of the separate constituents of the LAG satisfies the service level agreement performance requirements of the SLA, a data packet having the specific SLA requirement can be routed to a LAG constituent that has been determined to meet that specific SLA requirement 512. In the case where multiple constituents of the LAG have been found to satisfy the specific SLA, then load balancing can be performed to choose which constituent to route the data packet to. In one embodiment, the each of the child performance measurement packets and the data packet are routed through a common data tunnel.

Figure 6:
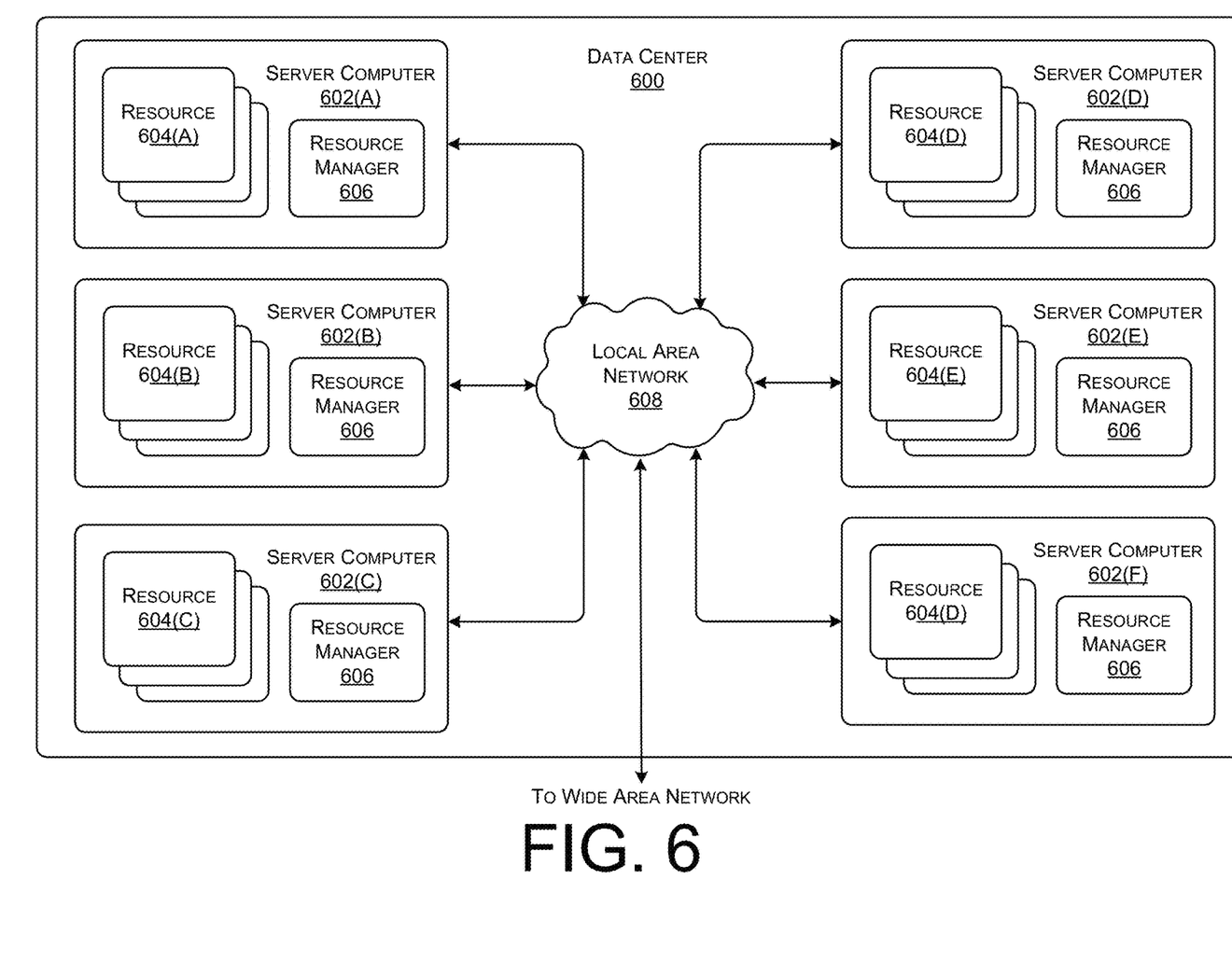
FIG. 6 illustrates a computing system diagram illustrating a configuration for a data center that can be utilized to implement aspects of the technologies disclosed herein.

FIG. 6 is a computing system diagram illustrating a configuration for a data center 600 that can be utilized to implement aspects of the technologies disclosed herein. The example data center 600 shown in FIG. 6 includes several server computers 602A-602F (which might be referred to herein singularly as "a server computer 602" or in the plural as "the server computers 602") for providing computing resources. In some examples, the resources and/or server computers 602 may include, or correspond to, the any type of networked device described herein. Although described as servers, the server computers 602 may comprise any type of networked device, such as servers, switches, routers, hubs, bridges, gateways, modems, repeaters, access points, etc.

The server computers 602 can be standard tower, rack-mount, or blade server computers configured appropriately for providing computing resources. In some examples, the server computers 602 may provide computing resources 604 including data processing resources such as VM instances or hardware computing systems, database clusters, computing clusters, storage clusters, data storage resources, database resources, networking resources, and others. Some of the servers 602 can also be configured to execute a resource manager 606 capable of instantiating and/or managing the computing resources. In the case of VM instances, for example, the resource manager 606 can be a hypervisor or another type of program configured to enable the execution of multiple VM instances on a single server computer 602. Server computers 602 in the data center 600 can also be configured to provide network services and other types of services.

In the example data center 600 shown in FIG. 6, an appropriate LAN 608 is also utilized to interconnect the server computers 602A-602F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 700, between each of the server computers 602A-602F in each data center 600, and, potentially, between computing resources in each of the server computers 602. It should be appreciated that the configuration of the data center 600 described with reference to FIG. 6 is merely illustrative and that other implementations can be utilized.

In some examples, the server computers 602 may each execute one or more application containers and/or virtual machines to perform techniques described herein.

In some instances, the data center 600 may provide computing resources, like application containers, VM instances, and storage, on a permanent or an as-needed basis. Among other types of functionality, the computing resources provided by a cloud computing network may be utilized to implement the various services and techniques described above. The computing resources 604 provided by the cloud computing network can include various types of computing resources, such as data processing resources like application containers and VM instances, data storage resources, networking resources, data communication resources, network services, and the like.

Each type of computing resource 604 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 604 not mentioned specifically herein.

The computing resources 604 provided by a cloud computing network may be enabled in one embodiment by one or more data centers 600 (which might be referred to herein singularly as "a data center 600" or in the plural as "the data centers 600"). The data centers 600 are facilities utilized to house and operate computer systems and associated components. The data centers 600 typically include redundant and backup power, communications, cooling, and security systems. The data centers 600 can also be located in geographically disparate locations. One illustrative embodiment for a data center 600 that can be utilized to implement the technologies disclosed herein will be described below with regard to FIG. 7.

Figure 7:
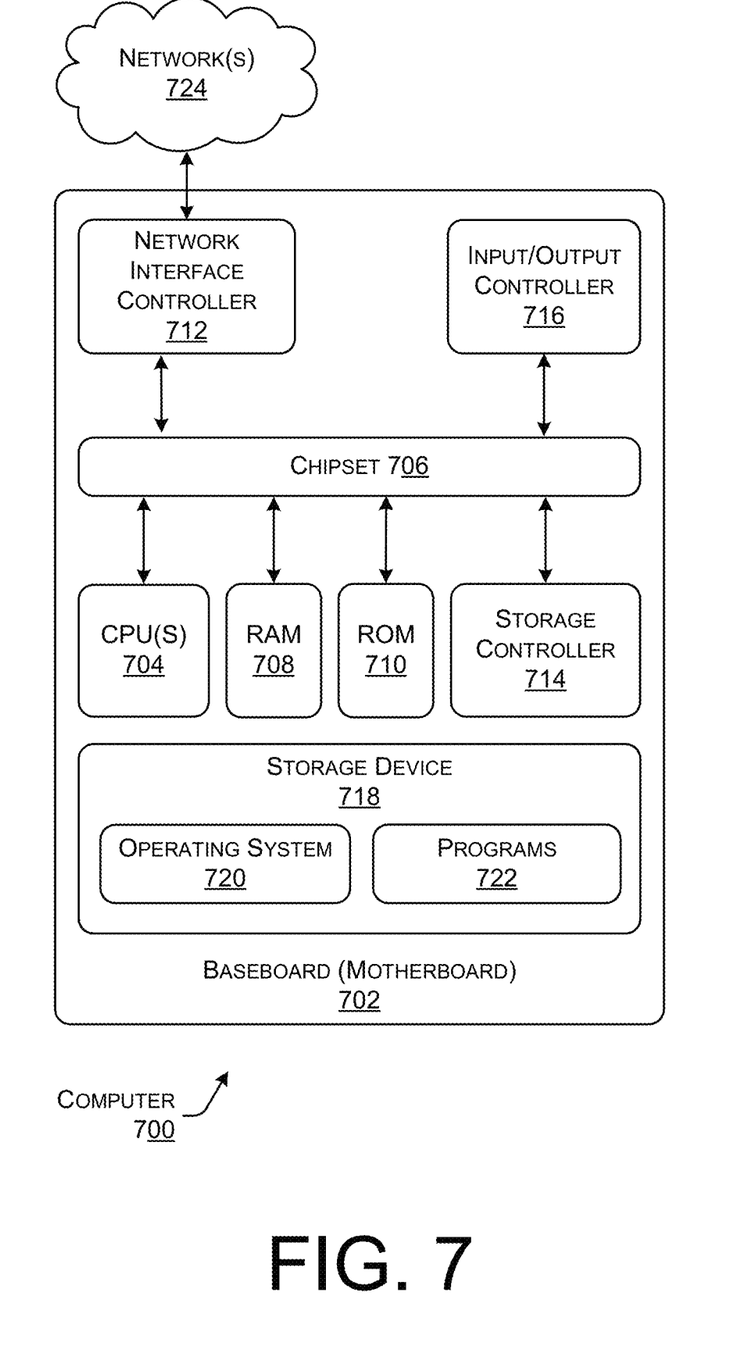
FIG. 7 is a computer architecture diagram showing an illustrative computer hardware architecture for implementing a computing device that can be utilized to implement aspects of the various technologies presented herein.

FIG. 7 shows an example computer architecture for a server computer 700 capable of executing program components for implementing the functionality described above. The computer architecture shown in FIG. 7 illustrates a conventional server computer, workstation, desktop computer, laptop, tablet, network appliance, routing switch, e-reader, smartphone, or other computing device, and can be utilized to execute any of the software components presented herein. The server computer 700 may, in some examples, correspond to a physical server 110 of FIG. 1, or can correspond to networking switch 116 of FIG. 1, and may comprise other networked devices such as servers, switches, routers, hubs, bridges, gateways, modems, repeaters, access points, etc. In one embodiment the computer 700 can be used to perform the method 500 described above with reference to FIGS. 5A-5B.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 700 can further provide an interface to a computer-readable storage medium such as a read-only memory ("ROM") 710 or non-volatile RAM ("NVRAM") for storing basic routines that help to startup the computer 702 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the network 724 or network 608 of FIG. 6. The chipset 706 can include functionality for providing network connectivity through a NIC 712, such as a gigabit Ethernet adapter. The NIC 712 is capable of connecting the computer 700 to other computing devices over the network 724 (and/or 608) or network 102 of FIG. 1. It should be appreciated that multiple NICs 712 can be present in the computer 700, connecting the computer to other types of networks and remote computer systems.

The computer 700 can be connected to a storage device 718 that provides non-volatile storage for the computer. The storage device 718 can store an operating system 720, programs 722, and data, which have been described in greater detail herein. The storage device 718 can be connected to the computer 602 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700. In some examples, the operations performed by devices in the network architecture 100, and or any components included therein, may be supported by one or more devices similar to computer 700.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 700. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 718 can store other system or application programs and data utilized by the computer 700.

In one embodiment, the storage device 718 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various processes described above with regard to FIGS. 1-5B. The computer 700 can also include computer-readable storage media having instructions stored thereupon for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or might utilize an architecture completely different than that shown in FIG. 7.

As described herein, the computer 700 may comprise one or more of a router, load balancer and/or server. The computer 700 may include one or more hardware processors 704 (processors) configured to execute one or more stored instructions. The processor(s) 704 may comprise one or more cores. Further, the computer 700 may include one or more network interfaces configured to provide communications between the computer 700 and other devices, such as the communications described herein as being performed by the router, load balancer and/or server. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 722 may comprise any type of programs or processes to perform the techniques described in this disclosure for providing a Service Level Agreement data routing in a Link Aggregation Group. That is, the computer 700 may comprise any one of the routers, load balancers, and/or servers. The programs 722 may comprise any type of program that cause the computer 700 to perform techniques for communicating with other devices using any type of protocol or standard usable for determining connectivity.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for routing data applying service level agreement in a link aggregation group, the method comprising:
   receiving by a network switch, a performance measurement packet;
   splitting the performance measurement packet into child performance measurement packets;
   routing each of the child performance measurement packets through separate constituent links of a link aggregation group;
   determining performance parameters of each of the separate constituent links based on each of the child performance measurement data packets;
   in response to determining performance parameters of each of the separate constituent links, determining whether one or more of the constituents satisfies a service level agreement performance parameter; and
   in response to determining whether one or more of the constituent links satisfies the service level agreement performance parameter, routing a data packet requiring the service level agreement performance parameter through one of the one or more constituents determined to satisfy the service level agreement performance parameter.

2. The method as in claim 1, wherein each child performance measurement packet has a unique link aggregation group constituent identifier.

3. The method as in claim 2, wherein the unique link aggregation group constituent identifier comprises a type-length-value extension.

4. The method as in claim 1, wherein the child performance measurement packets and the data packet are routed through a common data tunnel.

5. The method as in claim 1, wherein the performance measurement packet and each of the child performance measurement packets are bidirectional forwarding detection packets.

6. The method as in claim 1, wherein each of the child performance measurement packets is a bidirectional forwarding detection packet, the method further comprising, after routing the child performance measurement packet to the separate constituent link:
   receiving each of the child performance measurement packets; and
   decoding each of the received child performance measurement packets to determine which service level agreement performance parameters are satisfied by each constituent link.

7. The method as in claim 1, wherein the service level agreement performance parameters include one or more of latency, jitter, and loss.

8. A network switch applying service level agreement in a link aggregation group, the network switch comprising:
one or more processors; and
one or more non-transitory computer-readable media storing computer-executable instructions that, when executed by the one or more processors, cause the one or more processors to perform operations comprising:
receiving by the network switch, a performance measurement packet;
splitting the performance measurement packet into child performance measurement packets;
routing each of the child performance measurement packets through separate constituent links of a link aggregation group;
determining performance parameters of each of the separate constituent links based on each of the child performance measurement packets;
in response to determining performance parameters of each of the separate constituent links based on each of the child performance measurement packets, determining whether one or more of the constituent links satisfies a service level agreement performance parameter; and
in response to determining whether one or more of the constituents satisfies the service level agreement performance parameter, routing a data packet requiring the service level agreement performance parameter through one of the one or more constituents determined to satisfy the service level agreement performance parameter.

9. The network switch as in claim 8, wherein each child performance measurement packet has a unique link aggregation group constituent identifier.

10. The network switch as in claim 9, wherein the unique link aggregation group constituent identifier comprises a type-length-value.

11. The network switch as in claim 8, wherein the child performance measurement packets and the data packet are routed through a common data tunnel.

12. The network switch as in claim 8, wherein the performance measurement packet and each of the child performance measurement packets are bidirectional forwarding detection packets.

13. The network switch as in claim 8, wherein each of the child performance measurement packets is a bidirectional forwarding detection packet, the operations further comprising, after routing the child performance measurement packet to the separate constituent link:
receiving each of the child performance measurement packets; and
decoding each of the received child performance measurement packets to determine which service level agreement performance parameters are satisfied by each constituent link.

14. One or more non-transitory computer-readable media storing computer-executable instructions that, when executed by one or more processors, cause the one or more processors to perform operations comprising:
receiving by a network switch, a performance measurement packet;
splitting the performance measurement packet into child performance measurement packets;
routing each of the child performance measurement packets through separate constituent links of a link aggregation group;
determining performance parameters of each of the separate constituent links based on each of the child performance measurement packets;
in response to determining performance parameters of each of the separate constituent links, determining whether one or more of the constituent links satisfies a service level agreement performance parameter; and
in response to determining whether one or more of the constituent links satisfies the service the service level agreement performance parameter, routing a data packet requiring the service level agreement performance parameter through the one or more constituent links determined to satisfy the service level agreement performance parameter.

15. The one or more non-transitory computer-readable media as in claim 14, wherein each child performance measurement packet has a unique link aggregation group constituent identifier.

16. The one or more non-transitory computer-readable media as in claim 15, wherein the unique link aggregation group constituent identifier comprises a type-length-value extension.

17. The one or more non-transitory computer-readable media as in claim 14, wherein the child performance measurement packets and the data packet are routed through a common data tunnel.

18. The one or more non-transitory computer-readable media as in claim 14, wherein the performance measurement packet and each of the child performance measurement packets are bidirectional forwarding detection packets.

19. The one or more non-transitory computer-readable media as in claim 14, wherein each of the child performance measurement packets is a bidirectional forwarding detection packet, the operations further comprising, after routing the child performance measurement packet to the separate constituent link:
receiving each of the child performance measurement packets; and
decoding each of the received child performance measurement packets to determine which service level agreement performance parameters are satisfied by each constituent link.

20. The one or more non-transitory computer-readable media as in claim 14, wherein the service level agreement performance parameters include one or more of latency, jitter, and loss.

* * * * *